(12) United States Patent
Flatman et al.

(10) Patent No.: US 6,701,717 B2
(45) Date of Patent: Mar. 9, 2004

(54) CYCLE GAS TURBINE ENGINE (75) Inventors: Richard J Flatman, Derby (GB); Christopher Freeman, Nottingham (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/206,770

(22) Filed: Jul. 29, 2002

(65) Prior Publication Data

US 2003/0033813 A1 Feb. 20, 2003

Related U.S. Application Data (63) Continuation of application No. PCT/GB01/00317, filed on Jan. 29, 2001.

(51) Int. Cl.[7] .................................................. F02C 9/18
(52) U.S. Cl. ......................................... 60/792; 60/39.17
(58) Field of Search .......................... 60/39.17, 39.25, 60/262, 792

(56) References Cited

U.S. PATENT DOCUMENTS

| | | | |
|---|---|---|---|
| 3,041,822 A | * | 7/1962 | Embree ........................ 60/262 |
| 3,070,131 A | * | 12/1962 | Wheatley ..................... 60/262 |
| 3,385,509 A | | 5/1968 | Garnier |
| 3,751,909 A | | 8/1973 | Kohler |

FOREIGN PATENT DOCUMENTS

| | | |
|---|---|---|
| DE | 856 036 A | 9/1952 |
| EP | 0 247 984 A | 12/1987 |
| GB | 490 198 | 8/1938 |
| GB | 701 324 | 12/1953 |

OTHER PUBLICATIONS

Treager, Irwin E. Aircraft Gas Turbine Engine Technology. McGraw–Hill, 1970; p. 10.*

* cited by examiner

Primary Examiner—Louis J. Casaregola
(74) Attorney, Agent, or Firm—W. Warren Taltavull; Manelli Denison & Selter PLLC (57) ABSTRACT A variable cycle gas turbine engine (10) includes first and second compressors (18,16), combustion apparatus (20) and first and second turbines (22,24) operable to drive the first and second compressors (18,16) respectively via interconnecting shafts. The capacity of one of the turbines (24) may be varied, for example by means of guide vanes (32) which can be adjusted to reduce or increase a throat area (40) through which air leaves the guide vanes to impact the turbine. The capacity of the turbine may be increased at low engine speeds, to reduce the pressure ratio across the turbine and across the compressor (16) which it drives, thereby improving the surge margin of the compressor.

9 Claims, 6 Drawing Sheets

CYCLE GAS TURBINE ENGINE

This is a continuation of International Appln. No. PCT/GB01/00317 filed Jan. 29, 2001.

FIELD OF THE INVENTION

The invention relates to gas turbine engines and particularly to variable cycle gas turbine engines for aero applications.

BACKGROUND OF THE INVENTION

High efficiency gas turbine engines for aero applications require a high overall pressure ratio across their compressors, in order to minimise fuel consumption. A typical overall pressure ratio for such an engine might be greater than 40:1 and this results in a need for compressors with high numbers of stages and high pressure ratios across each stage. The compressors tend to be designed for their highest efficiency at high speeds, but this may cause difficulties at lower speeds.

If the operating conditions imposed upon a compressor blade depart too far from the design intention, breakdown of airflow and/or aerodynamically induced vibration may occur. If the engine demands a pressure rise from the compressor which is higher than the compressor can sustain, "surge" occurs. This involves an instantaneous breakdown of flow through the engine and the expulsion of high pressure air from the combustion system forward through the compressor. This produces a loud "bang" and results in a loss of engine thrust.

Compressors are designed with an adequate margin to ensure that the unstable area where surge may occur is avoided. The margin between the unstable area and the working line of a particular compressor is known as the surge margin.

For compressors designed for high efficiency at high speeds, the surge margin at low speeds tends to be too low. In order to overcome the low surge margin, various adjustments may be made to the compressor at such low speeds, as follows.

One method of improving the surge margin at low speeds is to introduce airflow control into the compressor design. This may take the form of variable inlet guide vanes for the first stage and variable stator vanes for subsequent stages. As the compressor speed is reduced from its design value, these static vanes are progressively closed in order to maintain an acceptable air angle onto the following rotor blades. Alternatively or additionally air may be bled off the compressor in order to reduce its pressure ratio. This tends to increase the surge margin to an acceptable level. However, this has an adverse effect on fuel consumption.

Other known ways of providing an acceptable surge margin involve using additional compressor stages in order to reduce the pressure ratio across each stage or using lower compressor efficiencies. The former solution is expensive, whilst the latter results in poor fuel consumption.

SUMMARY OF THE INVENTION

According to one aspect of the invention there is provided a variable cycle gas turbine engine including first and second compressors, combustion apparatus and first and second turbines operable to drive the first and second compressors respectively via interconnecting shafts, wherein means are provided for varying the capacity of at least one of the turbines.

Probably the first turbine operates at a higher pressure than the second turbine, the first compressor operates at a higher pressure than the second compressor, and means are provided for varying the capacity of the second turbine.

The engine may further include a third turbine operable to drive a third compressor or fan, the third turbine and compressor or fan operating at lower pressures than the first and second turbines and compressors.

The means for varying the capacity of the turbine may include means for reducing the pressure ratio across the turbine, to reduce the pressure ratio across the compressor which it drives.

The means for varying the capacity of the turbine may include means for varying the work done by the turbine and the torque applied by the turbine to the shaft connecting the turbine to the compressor which it drives.

The variable capacity turbine may include a stator vane assembly for directing air onto a turbine rotor assembly of the turbine, the stator vane assembly comprising an annular array of substantially radially extending stator vanes circumferentially spaced apart so as to define throat areas therebetween, the stator vanes being adjustable to vary the throat areas between adjacent stator vanes. The stator vanes may be continuously adjustable so that the throat areas are continuously variable between maximum and minimum values.

The stator vanes may be adjustable to vary the angle at which air passing through the throat areas impacts the turbine rotor assembly.

Each stator vane may be pivotable about an axis which extends generally in a radial direction of the vane. Alternatively each stator vane may include a substantially fixed portion and a movable portion, the movable portion being pivotable relative to the fixed portion to vary the throat areas between adjacent stator vanes. The movable portion of each stator vane may be pivotable about an axis which extends generally in the radial direction of the vane.

The gas turbine engine may include means for bleeding air from one or more of the compressors and feeding such air into a region downstream of and in fluid communication with the second turbine, thereby to vary the capacity of the second turbine.

A stator vane downstream of the second turbine may be hollow and may include a plurality of orifices passing through a wall thereof, and means may be provided for passing air into the inside of the stator vane to allow ejection of the air through the orifices to a region downstream of the second turbine.

According to another aspect of the invention, there is further provided a method of operating a gas turbine engine as previously defined wherein when the engine runs at low power, the capacity of the variable capacity turbine is increased, thereby reducing the pressure ratio across the variable capacity turbine and reducing the pressure ratio across the compressor which it drives. As the pressure ratio across the variable capacity turbine is reduced, the pressure ratio across a turbine upstream thereof may increase, thereby increasing the pressure ratio across a compressor driven thereby.

DESCRIPTION OF THE DRAWINGS

Embodiments of the invention will be described for the purpose of illustration only with reference to the accompanying drawings in which:—

DETAILED DESCRIPTION OF THE INVENTION

Figure 1:
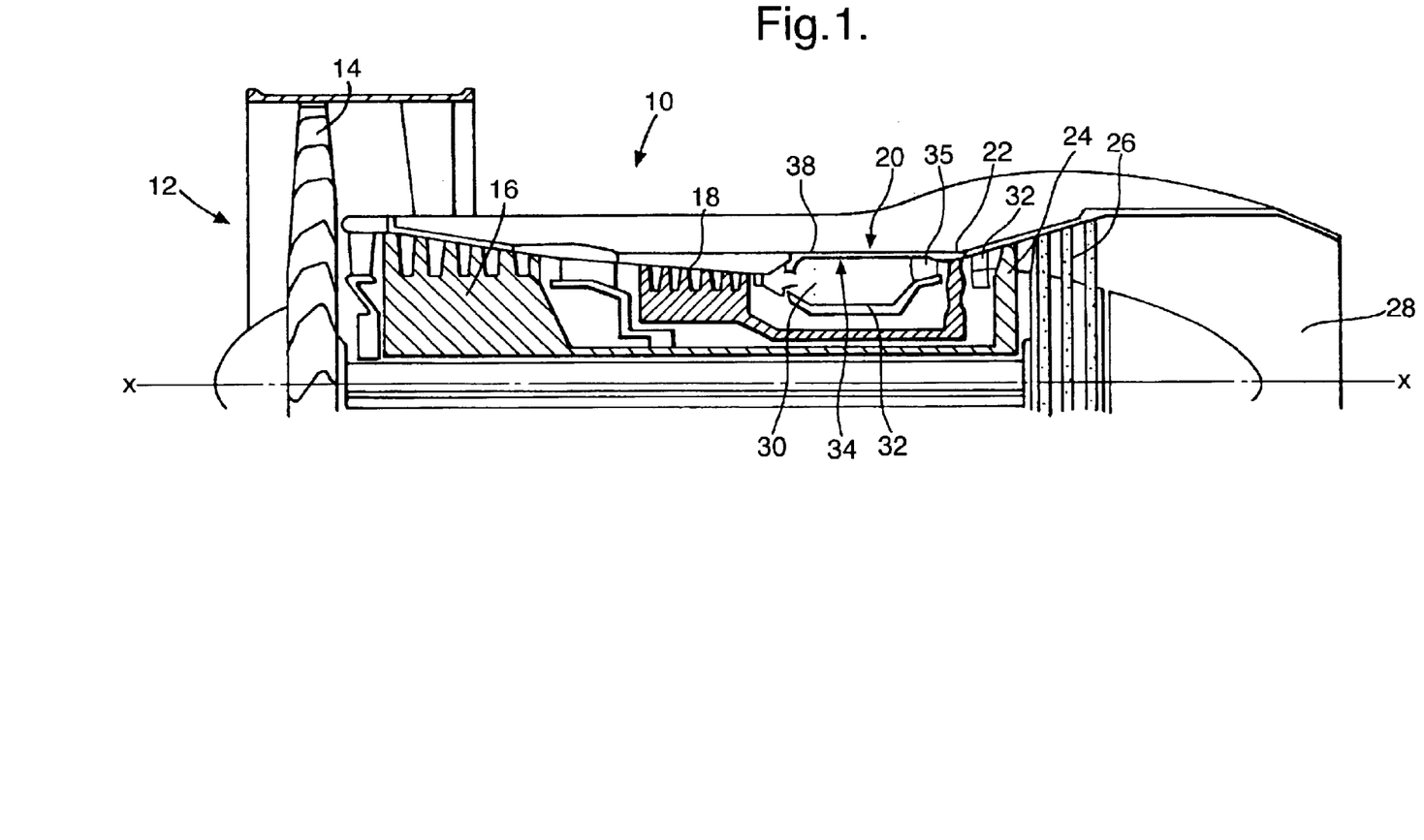
FIG. 1 is a diagrammatic sectional view of the upper half of a gas turbine engine.

Referring to FIG. 1, a gas turbine engine is generally indicated at 10 and comprises, in axial flow series, an air intake 12, a propulsive fan 14, an intermediate pressure compressor 16, a high pressure compressor 18, combustion equipment 20, a turbine arrangement comprising high pressure turbine 22, an intermediate pressure turbine 24 and a low pressure turbine 26, and an exhaust nozzle 28.

The gas turbine engine 10 works in a conventional manner so that air entering the intake 12 is accelerated by the fan 14 to produce two airflows: a first airflow into the intermediate pressure compressor 16 and a second airflow which provides propulsive thrust. The intermediate pressure compressor 16 compresses the airflow directed into it before delivering that air to the high pressure compressor 18 where further compression takes place.

The compressed air exhausted from the high pressure compressor 18 is directed into the combustion equipment 20 where it is mixed with fuel and the mixture combusted. The resultant hot combustion product then expands through, and thereby drives, the high, intermediate and low pressure turbines 22, 24 and 26 respectively. The air is finally exhausted through the exhaust nozzle 28 to provide additional propulsive thrust. The high, intermediate and low pressure turbines 22, 24 and 26 drive the high and intermediate compressors 18 and 16 and the fan 14 through suitable interconnecting shafts.

In order for the gas turbine engine to work at high efficiency, it is necessary for the overall pressure ratio (i.e. the ratio of the pressure at the output of the compressor to the pressure at the input of the compressor) to be relatively high. In modern, efficient engines the pressure ratio may be more than 40:1. A consequence of this high pressure ratio is the need for compressors with high numbers of stages and high pressure ratios across each stage.

The compressors tend to be designed for their highest efficiency at high speeds. However, this may cause difficulties at low speeds. If the operating conditions imposed upon the compressor blade depart too far from the design intention, breakdown of airflow and/or aerodynamically induced vibration may occur. These phenomena may take one of two forms: firstly the blades may stall because the angle of incidence of the air relative to the blade is too high or too low. Secondly, if the engine demands a pressure from the compressor which is higher than the compressor blading can sustain, "surge" occurs. In this case, there is an instantaneous breakdown of flow through the engine and the high pressure air in the combustion system is expelled forward through the compressor with a loud "bang" and a resultant loss of engine thrust.

Figure 2:
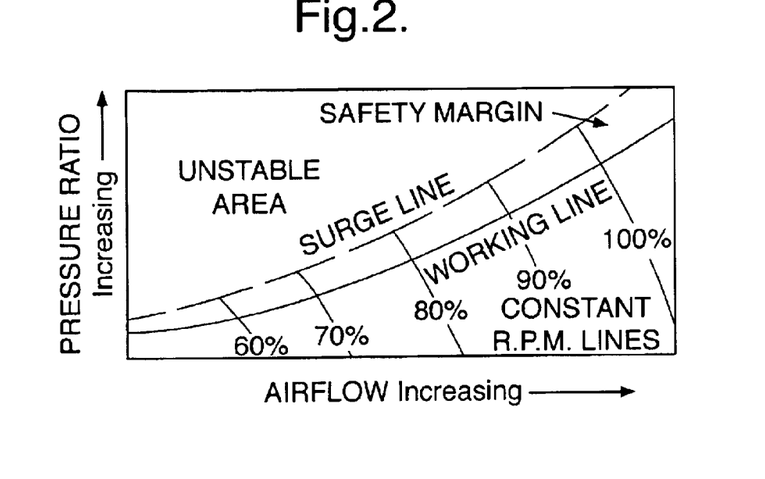
FIG. 2 is graph of pressure ratio against airflow for a compressor of a gas turbine engine.
Figure 3:
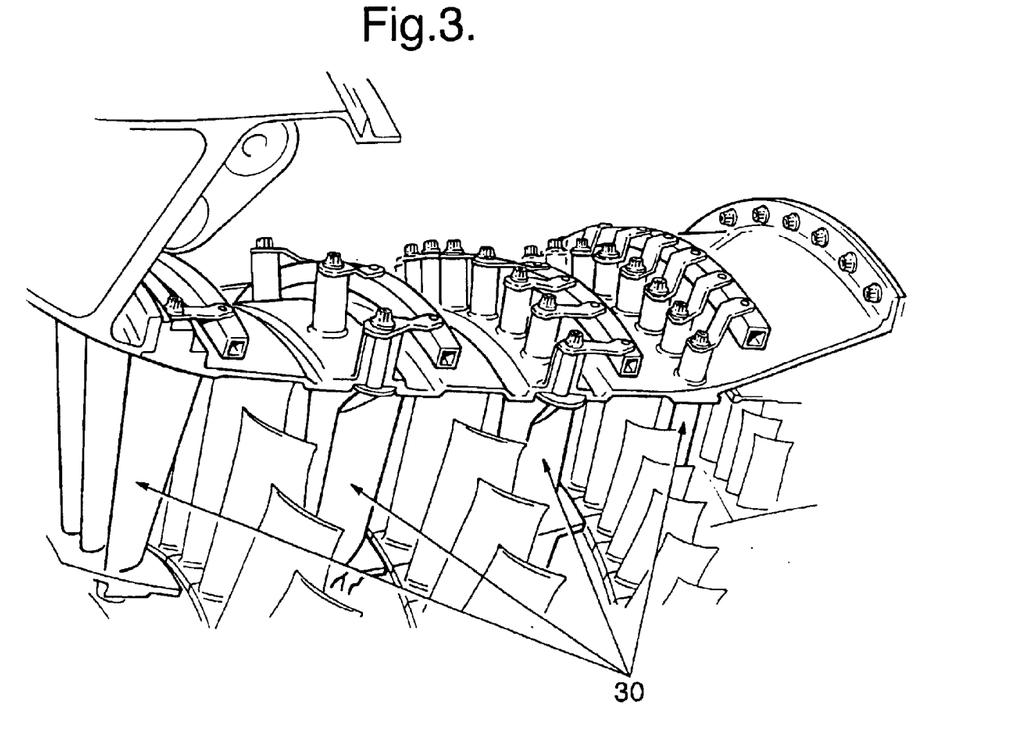
FIG. 3 is a diagrammatic partial illustration of prior art variable stator vanes for use in a compressor of a gas turbine engine.

FIG. 2 is a graph illustrating the limits of stable air flow through the compressor. If the compressor is worked within the unstable area above the surge line, airflow may break down and surge occur. The compressor is therefore worked such that its pressure ratio and airflow remains on a working line separated from the surge line by a safety margin, referred to as the surge margin.

Where high pressure ratios are required on a single shaft, it becomes necessary to introduce airflow control into the compressor design to ensure that the surge margin is always sufficiently large. Referring to FIG. 3, each stage of the compressor may be provided with variable stator vanes 30 which may rotate about their axes. As the compressor speed is reduced from its design value, the stator vanes are progressively closed in order to maintain an acceptable air angle onto the following rotor blades. This prevents surge from occurring, but is relatively complex and expensive.

The difficulties involved in maintaining an adequate surge margin are particularly acute for the intermediate pressure compressor of the gas turbine engine illustrated in FIG. 1.

The invention allows the surge margin of the intermediate pressure compressor to be controlled by varying the capacity of the intermediate pressure turbine. Turbine capacity is defined as:

$$\text{turbine capacity} = \frac{\text{mass airflow} \times \sqrt{\text{turbine inlet temperature}}}{\text{turbine inlet pressure}}$$

Figure 4:
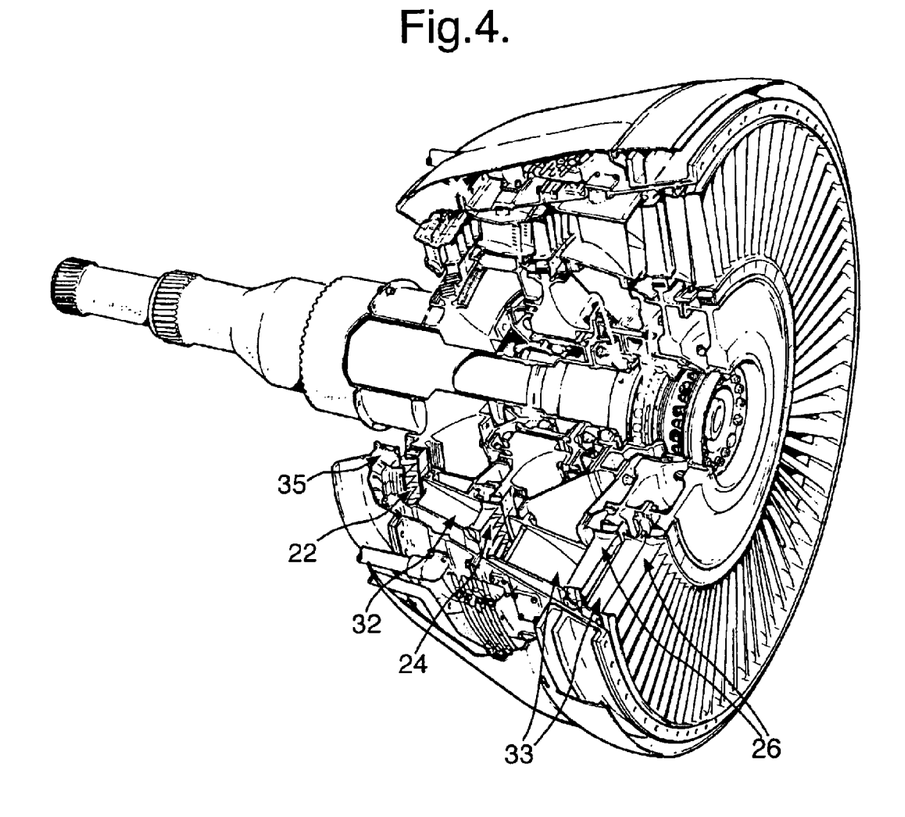
FIG. 4 is a diagrammatic perspective view of a turbine and shaft arrangement of a gas turbine engine.

FIG. 4 illustrates a known triple turbine and shaft arrangement, including high, intermediate and low pressure turbines 22, 24 and 26 respectively. In FIG. 4, the high and intermediate pressure turbines 22 and 24 are each single stage turbines and the low pressure turbine 26 is a two stage turbine. However, any of the turbines may consist of several stages.

Directly upstream of and adjacent to the intermediate pressure turbine 24 is a stator vane assembly in the form of an annular array of radially extending nozzle guide vanes 32. Each stage of the low pressure turbine 26 also includes an array of nozzle guide vanes 33 and the high pressure turbine includes an array of nozzle guide vanes 35.

The nozzle guide vanes direct the hot gases released from the combustion system onto the turbine, the hot gases thereby driving the turbine whilst losing pressure.

Figure 5:
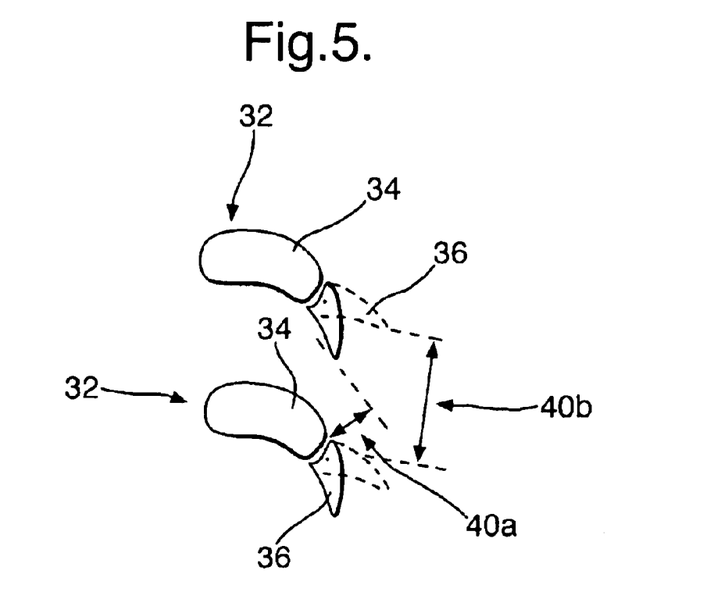
FIG. 5 is a diagrammatic illustration of variable nozzle guide vanes according to the invention.
Figure 6:
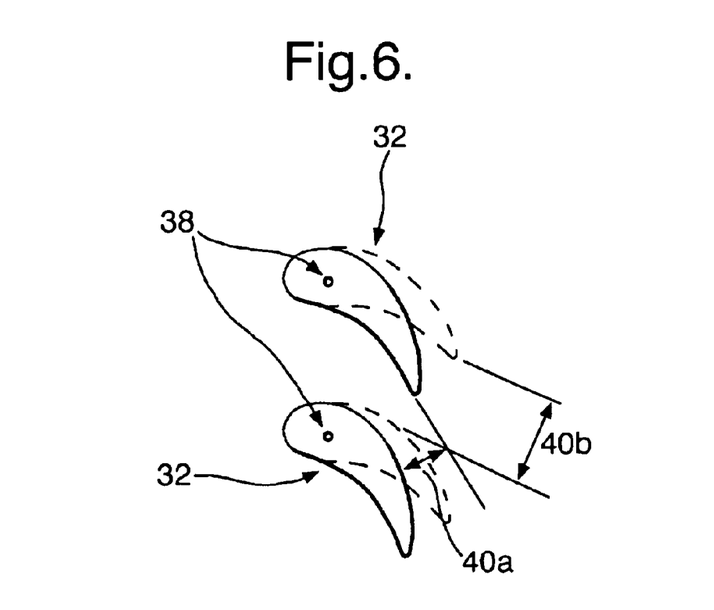
FIG. 6 is a diagrammatic illustration of alternative variable nozzle guide vanes according to the invention.

Referring to FIG. 5, an intermediate pressure nozzle guide vane 32 includes a fixed body portion 34 and a movable trailing edge portion 36. FIG. 6 illustrates an alternative nozzle guide vane 32 which is pivotable about a fixed centre point 38. Each of the two nozzle guide vanes 32 illustrated in FIGS. 5 and 6 may be adjusted to move between the positions indicated with full lines and the positions indicated with dotted lines. The vanes 32 are continuously adjustable so as to be locatable in any position between the two extremes illustrated.

It may be seen that when the nozzle guide vanes 32 are in the positions indicated in full lines, a nozzle throat area 40a through which air leaves the nozzle guide vanes to impact the turbine blades is relatively small. In contrast, when the nozzle guide vanes 32 are in the positions indicated with dotted lines, a nozzle throat area 40b is larger.

When the engine is running at low speed, the nozzle guide vanes 32 may be moved from the positions indicated with full lines to the positions indicated with dotted lines. This increases the nozzle throat area 40 and increases the capacity of the intermediate pressure turbine downstream of the nozzle guide vanes. The pressure ratio across the intermediate pressure turbine reduces, the speed of rotation of the turbine reduces somewhat and the turbine provides significantly less power and torque.

When the above occurs, the speed of rotation of the shaft connecting the intermediate pressure turbine with the intermediate pressure compressor reduces, and the torque transmitted by this shaft reduces. This results in the intermediate compressor slowing down and generating a reduced pressure ratio thereacross. The reduction in the pressure ratio results in the intermediate pressure compressor working further from the surge line.

Figure 7A:
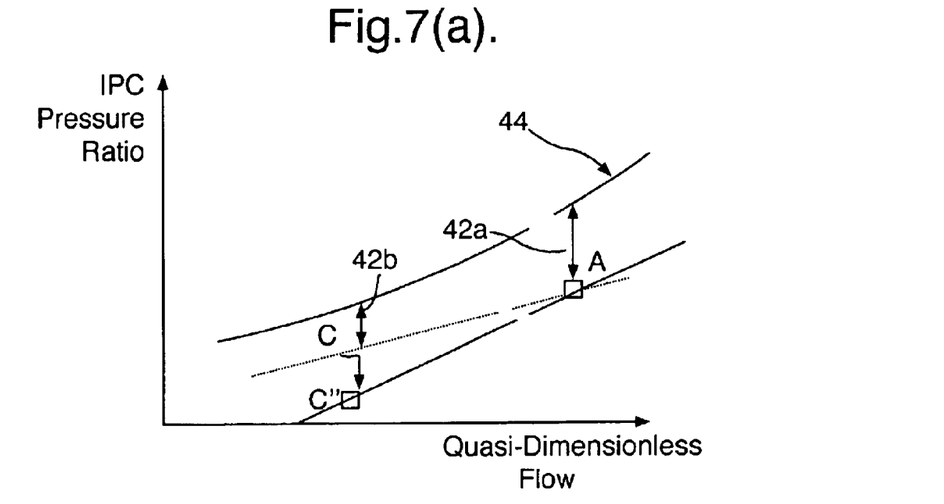
FIGS. 7A and 7B are graphs of pressure ratio against non-dimensional flow for the intermediate pressure compressor and the high pressure compressor respectively of a gas turbine engine according to the invention
Figure 7B:
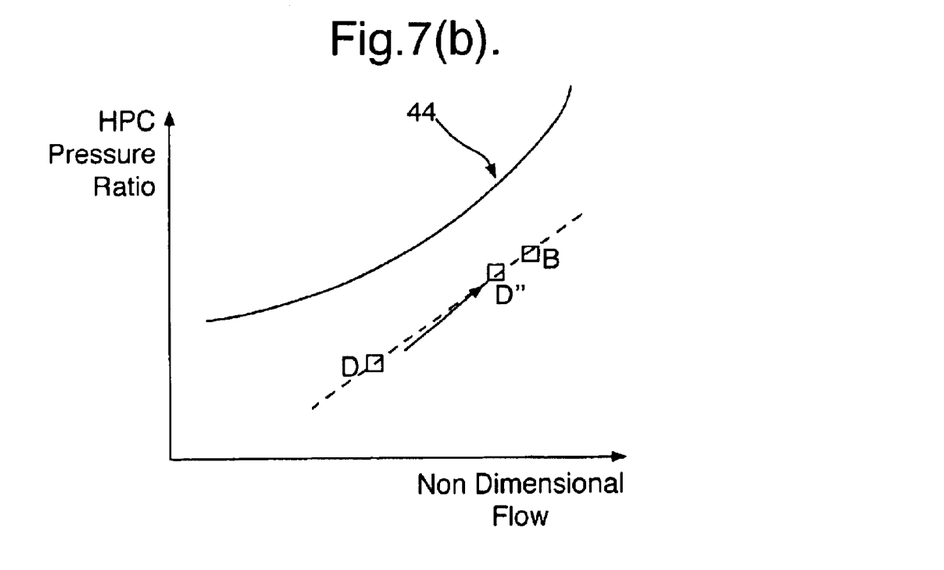

FIGS. 7A and 7B illustrate the effect of the invention on the working of the engine. FIG. 7A is a graph of intermediate pressure compressor pressure ratio against quasi-dimensionless flow through the compressor, and FIG. 7B is a similar graph for the high pressure compressor.

When the engine is running at high power, the intermediate pressure compressor operates at point A on the graph and the high pressure compressor operates at point B. In each case there is a clear surge margin (42a in FIG. 7A) between the working point and the surge line 44.

If the engine is throttled back to low power, the intermediate pressure compressor tends to work at point C on the graph and the high pressure compressor at point D. For a conventional engine of high pressure ratio, it is not usually acceptable to work at point C, as the surge margin 42b is too low. In the embodiments shown in FIGS. 5 and 6, at low power the capacity of the intermediate pressure turbine is varied by altering the intermediate pressure nozzle guide vane throat area 40. As the throat area 40 is increased, the pressure ratio across the intermediate pressure turbine is reduced. The air flowing through the turbine does less work and the torque applied to the shaft drops. The power may drop by about 38%, the torque by about 32% and the speed by about 9%. The intermediate pressure turbine applies less torque down the connecting shaft to the intermediate pressure compressor and the speed of rotation of the shaft decreases. Because the shaft driving the intermediate pressure compressor applies less torque and slows down, the pressure ratio across the intermediate pressure compressor is reduced. The intermediate pressure compressor thus works at point C" in FIG. 7A. This improves the surge margin and allows the intermediate pressure compressor to work at a point which is well away from its unstable area even at low power.

The reduction of pressure ratio across the intermediate pressure turbine results in a decrease in pressure on the upstream side of the intermediate pressure turbine. This results in an increase in the pressure ratio across the adjacent high pressure turbine. The high pressure turbine thus speeds up and is able to exert more torque down the shaft to the high pressure compressor. The high pressure compressor also speeds up and an increased pressure ratio is generated thereacross. Referring to FIG. 7B, the working point of the high pressure compressor moves from D to D". Point D" is still well away from the surge line 44 of the high pressure compressor.

The variation of the intermediate pressure turbine capacity therefore shifts work from the intermediate pressure compressor to the high pressure compressor. The high pressure compressor operates well away from the surge line even at low power conditions and is therefore able to perform more work and sustain an increased pressure ratio even at low power.

Because the vanes 32 are fully adjustable, the amount of work shifted from the intermediate to the high pressure compressor may be controlled very precisely.

Figure 8:
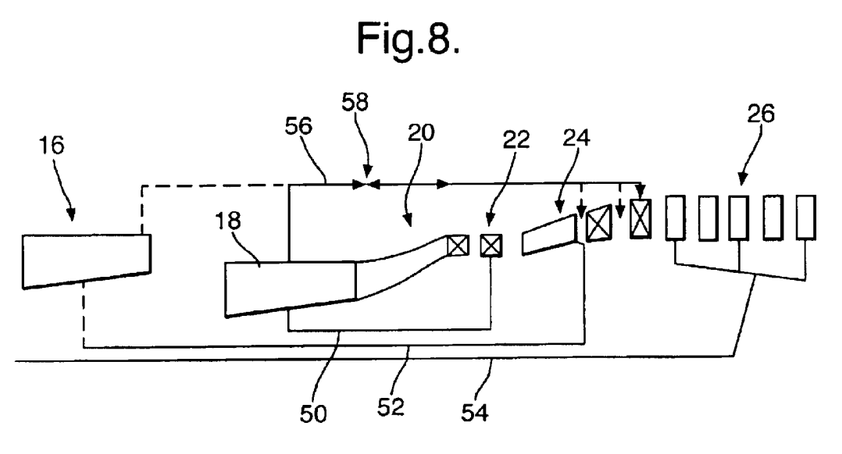
FIG. 8 is a diagrammatic sectional view of a gas turbine engine according to a further embodiment of the invention.
Figure 9:
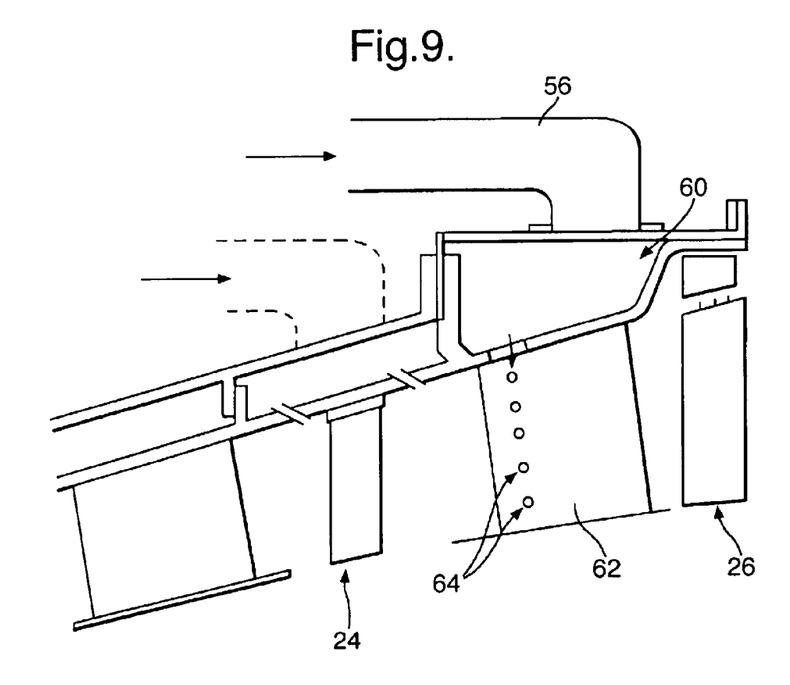
FIG. 9 is a diagrammatic partial view of the gas turbine engine of FIG. 8.

An alternative embodiment of the invention is illustrated in FIGS. 8 and 9.

FIG. 8 is a schematic representation of part of a gas turbine engine 10 including an intermediate pressure compressor 16, a high pressure compressor 18, combustion equipment 20 and high, intermediate and low pressure turbines 22, 24 and 26 respectively. The high pressure turbine 22 drives the high pressure compressor 18 via a shaft 50, the intermediate pressure turbine 24 drives the intermediate pressure compressor 16 via a shaft 52 and the low pressure turbine 26 drives the low pressure compressor (not illustrated) via a shaft 54.

In order to reduce the capacity of the intermediate pressure turbine 24, air is bled off from a mid stage of the high pressure compressor 18 or from the rear of the intermediate pressure compressor 16 and fed to a downstream region of the intermediate pressure turbine. The air is fed through a pipe 56 via a control valve 58 to a manifold 60 on the turbine casing.

Referring to FIG. 9, air from the manifold 60 may be re-injected into the outer casing of the intermediate pressure turbine in a downstream region thereof. Alternatively the air may be injected into hollow nozzle guide vanes 62 which form part of a first stage of the low pressure turbine 26. The hollow nozzle guide vanes 62 are formed with holes 64 drilled in their outer walls, such that the infed air is ejected therethrough into a region downstream of the intermediate pressure turbine 24.

Injection of relatively high pressure air to a downstream side of the intermediate pressure turbine reduces the pressure ratio thereacross, resulting in reduced power, torque and speed of the turbine in the same manner as that discussed above in relation to the FIGS. 5 and 6 embodiments. The effect on the intermediate pressure and high pressure compressors is equivalent.

The bleed off-take positions may be chosen to give the most desirable handling effect for each application. Air may be bled not only from the high pressure compressor, but also the intermediate pressure compressor, either at a mid stage or its exit.

Alternative bleed re-injection points may be in the annulus wall in front of the intermediate pressure turbine rotor, or downstream of the rotor. In this case, the injection slots should be at as shallow an angle as possible to the flow path, and designed with appropriate whirl angle.

The above described embodiments therefore provide a gas turbine engine in which the intermediate pressure turbine capacity may be varied. This allows the definition of an effective intermediate pressure compressor working line which is much steeper than normal design practice would allow, maintaining an adequate surge margin even at low speeds. This allows the intermediate compressor to be designed with fewer stages and without variable vanes. The compressor requires a lower design surge margin and has higher efficiency. The invention also allows the number of bleed valves within the compressor to be reduced, improving efficiency and reducing noise. The high pressure compressor may be designed for higher stage loading due to the work sharing between the high pressure and intermediate pressure turbines, allowing near constant operating point for the high pressure compressor over most of a typical flight cycle.

Various modifications may be made to the above described embodiment without departing from the scope of the invention. In particular, the invention may be used in industrial gas turbine engines where the low pressure turbine is connected to an electrical generator rather than the low pressure compressor.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

What is claimed is:

1. A variable cycle gas turbine engine including first and second compressors, combustion apparatus and first and second turbines, the first and second turbines being operable to drive the first and second compressors respectively via interconnecting shafts, characterized in that means for bleeding air from at least one compressor and feeding such air between a downstream region of the first turbine and a first part of the second turbine, thereby to vary the capacity of the first turbine, so that in use, for a given engine power requirement the variation of the first turbine results in a corresponding variation in the capacity of the first turbine thereby preventing the first compressor from surging.

2. A variable cycle gas turbine engine according to claim 1 characterized in that the means for varying the capacity of the first turbine reduces the pressure ratio across the first turbine which in turn reduces the pressure ratio across the compressor which it drives.

3. A variable cycle gas turbine engine according to claim 1, wherein the first turbine operates at a higher pressure than the second turbine and the first compressor operates at a higher pressure than the second compressor.

4. a variable cycle gas turbine engine according to claim 1 wherein the engine comprises a third turbine operable to drive a third compressor via a third shaft, the third turbine being arranged upstream of the first turbine and the third compressor being arranged downstream of the first compressor.

5. a variable cycle gas turbine engine according to claim 4, wherein the third turbine and a third compressor operates at higher pressures than the first and second turbines and compressors respectively.

6. a variable cycle gas turbine engine according to claim 1 where in the means for bleeding air from at least one compressor comprises bleeding air from the first compressor.

7. a variable cycle gas turbine engine according to claim 4 wherein the means for bleeding air from at least one compressor comprises bleeding air from the third compressor.

8. A variable cycle gas turbine engine according to claim 1 wherein a first part of the second turbine comprises a stator vane, the stator vane being hollow and including a plurality of orifices passing through a wall thereof, and means being provided for passing air into the inside of the stator vane to allow ejection of the air through the orifices to a region downstream of the second turbine, thereby varying the capacity of the first turbine by reducing the pressure ratio across the first turbine.

9. A variable cycle gas turbine engine including first and second compressors, combustion apparatus and first and second turbines, the first and second turbines are operable to drive the first and second compressors respectively via interconnecting shafts, characterized in that means are included for varying the capacity of the second turbine, so that in use, for a given engine power requirement the variation of the second turbine results in a corresponding variation in the capacity of the first turbine thereby preventing the second compressor from surging including means for bleeding air from at least one compressor and feeding such air into a region downstream of and in fluid communication with the second turbine, thereby to vary the capacity of the second turbine, the stator vane downstream of the second turbine being hollow and including a plurality of orifices passing through a wall thereof, and means being provided for passing air into the inside of the stator vane to allow ejection of the air through the orifices to a region downstream of the second turbine.

* * * * *